United States Patent
Bell

(10) Patent No.: US 6,678,721 B1
(45) Date of Patent: Jan. 13, 2004

(54) SYSTEM AND METHOD FOR ESTABLISHING A POINT-TO-MULTIPOINT DSL NETWORK

(75) Inventor: Russell W. Bell, Freehold, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 0 days.

(21) Appl. No.: 09/358,192

(22) Filed: Jul. 21, 1999

Related U.S. Application Data

(60) Provisional application No. 60/108,947, filed on Nov. 18, 1998.

(51) Int. Cl.[7] .............................................. G06F 15/16
(52) U.S. Cl. ..................... 709/209; 709/208; 709/227; 709/251; 709/252; 370/229; 370/401
(58) Field of Search ............................... 709/709, 227, 709/250, 208, 209, 251, 252; 395/200.68; 375/222; 370/401, 229, 352; 710/8

(56) References Cited

U.S. PATENT DOCUMENTS

| | | | | |
|---|---|---|---|---|
| 5,754,799 A | * | 5/1998 | Hiles ........................... | 710/110 |
| 5,933,605 A | * | 8/1999 | Kawano et al. ........ | 395/200.68 |
| 6,101,216 A | * | 8/2000 | Henderson et al. ......... | 375/222 |
| 6,115,755 A | * | 9/2000 | Krishan ....................... | 709/250 |
| 6,119,162 A | * | 9/2000 | Li et al. ....................... | 709/227 |
| 6,122,281 A | * | 9/2000 | Donovan et al. ........... | 370/401 |
| 6,145,019 A | * | 11/2000 | Firooz et al. .................. | 710/8 |
| 6,169,741 B1 | * | 1/2001 | LeMaire et al. ............ | 370/401 |
| 6,279,032 B1 | * | 8/2001 | Short et al. .................. | 709/209 |
| 6,298,376 B1 | * | 10/2001 | Rosner et al. ............... | 709/209 |
| 6,324,163 B1 | * | 11/2001 | Alexander et al. .......... | 370/229 |
| 6,324,571 B1 | * | 11/2001 | Hacherl ....................... | 709/208 |
| 6,345,071 B1 | * | 2/2002 | Hamdi ......................... | 375/222 |
| 6,414,952 B2 | * | 7/2002 | Foley .......................... | 370/352 |

\* cited by examiner

Primary Examiner—Frantz B. Jean
Assistant Examiner—Thu Ha Nguyen
(74) Attorney, Agent, or Firm—Thomas, Kayden, Horstemeyer & Risley

(57) ABSTRACT

The present invention is directed to a system and method for establishing a point to multipoint communication network. Preferable, the point to multipoint communication network is established in the environment of a home of small office, and the invention is realized through a computer that may dynamically establish both LAN and WAN communications. Broadly, the system and method of the present invention are realized by a computer that is configured to assume a role as either a Master or a Slave on a LAN. If the computer is the first (or only) computer powered up on the LAN, then it assumes the role of Master. In this role, the computer establishes a communication link with a WAN (such as with an Internet Service Provider), and directs all WAN communications over the WAN, using a WAN frequency and protocol (such as DSL). As other computers join the LAN, then WAN communications from those computers are relayed through the Master to the WAN. These communications are relayed to the Master using a LAN frequency band. If upon power-up, however, another computer is identified as already being on the LAN (and configured as a Master), then the computer assumes a Slave configuration. In this configuration, all WAN communications are directed to the WAN by way of the Master computer, and are communicated to the Master computer using a LAN frequency band. Return communications, received from the WAN, are received by the Master, and directed to the appropriate Slave computer, using a LAN frequency band.

20 Claims, 6 Drawing Sheets

SYSTEM AND METHOD FOR ESTABLISHING A POINT-TO-MULTIPOINT DSL NETWORK

CROSS-REFERENCE TO RELATED APPLICATION

The present application claims the benefit of U.S. provisional patent application, Serial No. 60/108,947, filed Nov. 18, 1998, which is hereby incorporated by reference in its entirety.

BACKGROUND OF THE INVENTION

1. Field of the Invention

The present invention generally relates to communication systems, and more particularly, to a system and method for establishing a point-to-multipoint digital subscriber line (DSL) network.

2. Discussion of the Related Art

In recent years, telephone communication systems have expanded from traditional plain old telephone system (POTS) communications to include high-speed data communications as well. As is known, POTS communications include the transmission of voice information, as well as PSTN (public switched telephone network) modem information, control signals, and other information that is transmitted in the POTS bandwidth.

Prompted largely by the growth in Internet usage, the provision of xDSL services to customer premises has proliferated over recent years. In this regard, the descriptor "x" preceding the DSL designator is used to broadly denote a variety of DSL services, including ADSL, RADSL, HDSL, etc. As is known, xDSL transmissions are sent to customer premises over the same twisted pair cabling as POTS transmission are sent. Since xDSL transmissions are communicated in a frequency band that is separate and distinct from the POTS frequency band, transmitting both types of signals over the same cabling (even at the same time), generally is not a problem. Specifically, the POTS frequency band is defined between approximately DC and approximately 4 kHz, while xDSL frequency bands (although they vary depending upon the specific service) are generally defined by a lower cutoff frequency of approximately 26 kHz, and an upper cutoff frequency that depends upon the particular xDSL service. As will be used hereinafter, the term DSL will be used interchangeably with the term xDSL, and should be construed to generically reference any of the of the various DSL services.

As is known, DSL is an additional service the customer typically purchases from its local service provider. The local service provider typically charges an additional service charge for the provision of the service. Until recently, the additional service charges have been somewhat substantial, resulting in a general limitation of the service to business enterprises. However, the services are now becoming more affordable, and therefore in higher demand. For many individuals, households, and even small businesses, installation charges have often provided a "barrier to entry," in the past. However, with the development of standards like G.Lite, certain equipment requirements (e.g., pots splitters at the customer premises) have been eliminated, and therefore installation costs reduced.

Local area networks (LANs) have also helped reduce the "effective cost" of DSL services. In this regard, many small businesses (and even homes with multiple computers) implement LANs over which multiple computers can intercommunicate. In a LAN environment, a single DSL service/connection may be purchased and configured to allow all computers on the LAN to have access to the DSL service, and therefore access to the Internet or other wide area network (WAN). Although such computer configurations have increased the demand for DSL services, and effectively lowered the per computer cost for the DSL service, certain shortcomings exist, precipitating the desire for improvements in these systems.

To better illustrate, reference is made to FIG. 1, which is a block diagram illustrating a typical LAN configured for connection to a WAN. A typical LAN 10 may have a plurality of computers 12, 14, 16, and 18 interconnected for inter-communication. To enable this communication across the LAN 10, each computer typically contains a LAN card 13, 15, 17, in 19. As is well known, a LAN card provides the facilities in the lower-level's of the OSI model, to enable the computers to inter-communicate. Additional facilities and capabilities, however, are conventionally required in order for the computers to communicate over a WAN. These additional facilities are provided by way of a WAN card 20. As is known, a WAN card provides similar functionality to a LAN card, but the voltage levels, protocols, and modulation schemes for communicating over a WAN are different than those for communicating over a LAN. Accordingly the hardware associated with the transmission in reception of signals over a WAN versus signals over a LAN are different, and therefore different hardware is required.

In a typical configuration, however, only a single WAN card 20 is required. A single DSL service may be purchased and configured between the wide area network and the computer 12 having the WAN card 20. Nevertheless, communications from other computers, such as computer 14, 16, or 18, may be made over the WAN. For example, if computer 14 desires an Internet connection, this connection may be established and maintained for the combination of communications between computer 14 and computer 12 over the LAN, then computer 12 to the WAN, via the DSL service. As is also known, each computer in the LAN may be uniquely identified by an IP address, and this EP address may be used to relate direct and channel communications between the WAN and a respective computer. Alternatively, computer 12 may be the only computer configured with an IP (Internet Protocol) address, and the remaining computers 14, 16, and 18 may be identified by sub-IP addresses, making them "invisible" to the WAN, but readily identifiable by computer 12, or other computers on the LAN. Using protocols such as TCP/IP this communication flow may be established and maintained, in ways are well-known to persons of ordinary skill in the art, and therefore need not be described herein.

While a system, like the one broadly illustrated in FIG. 1, provides effective means for reducing the per computer cost of a DSL connection/service, there are nevertheless certain shortcomings in this system configuration. For example, this configuration is characterized by a single point of failure. Specifically, if the computer 12 having the WAN card 20 is shut down, or otherwise fails, then the remaining computers 14, 16, and 18 on the LAN 10 lose their ability to communicate over the WAN. Another problem relates to configurability and user-friendliness of the system. Particularly for home environments, and small business enterprises, which cannot readily afford a computer specialist, simplicity in system configuration and implementation is an important factor. It should be appreciated that the system in FIG. 1 requires a certain level of sophistication in installing and configuring the computer 12 having the WAN card. Further, if operational problems arise, then troubleshooting such a system requires a certain level of user sophistication.

Accordingly, it is desired to provide a networked computer system having the single DSL connection/service benefits of the system FIG. 1, but providing greater simplicity and user-friendliness from the end-user perspective.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the objects and advantages of the present invention, the present invention is directed to a system and method for establishing a point to multipoint communication network. Preferable, the point to multipoint communication network is established in the environment of a home of small office, and the invention is realized through a computer that may dynamically establish both LAN and WAN communications. Broadly, the system and method are realized by a computer that is configured to assume a role as either a Master or a Slave on a LAN. If the computer is the first (or only) computer powered up on the LAN, then it assumes the role of Master. In this role, the computer establishes a communication link with a WAN (such as with an Internet Service Provider), and directs all WAN communications over the WAN, using a WAN frequency and protocol (such as DSL). As other computers join the LAN, then WAN communications from those computers are relayed through the Master to the WAN. These communications are relayed to the Master using a LAN frequency band. If upon power-up, however, another computer is identified as already being on the LAN (and configured as a Master), then the computer assumes a Slave configuration. In this configuration, all WAN communications are directed to the WAN by way of the Master computer, and are communicated to the Master computer using a LAN frequency band. Return communications, received from the WAN, are received by the Master, and directed to the appropriate Slave computer, using a LAN frequency band.

In accordance with one aspect of the present invention a method is provided for establishing a digital subscriber line (DSL) connection with a WAN, from within a LAN. Broadly, the method includes the steps of communicating a broadcast message over the LAN, awaiting a reply, assuming a master configuration, if no reply is received within a timeout period, and assuming a slave configuration, if a reply is received, wherein the reply identifies a computer that is configured as a master.

In accordance with another aspect of the invention, a communication circuit is provided for configuring a computer to communicate over both a LAN and a WAN. The communication circuit includes WAN communication circuitry for generating signals for communication over the WAN in accordance with a predetermined transmission frequency and protocol. The communication circuit also includes LAN communication circuitry for generating signals for intra-LAN communication, the LAN communication circuitry configured to generate a signal that is transmitted in a frequency band that exceeds the highest transmission frequency of signals communicated over the WAN. Detection circuitry is provided for detecting whether another at least one other computer is communicating with the LAN. In addition master circuitry, responsive to the detection circuitry, is provided for configuring the computer as a Master computer on the LAN, if no other computers are initially in communication with the LAN. Finally, slave circuitry is provided, responsive to the detection circuitry, for configuring the computer as a Slave computer on the LAN, if at least one other computer is detected as being in communication with the LAN.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
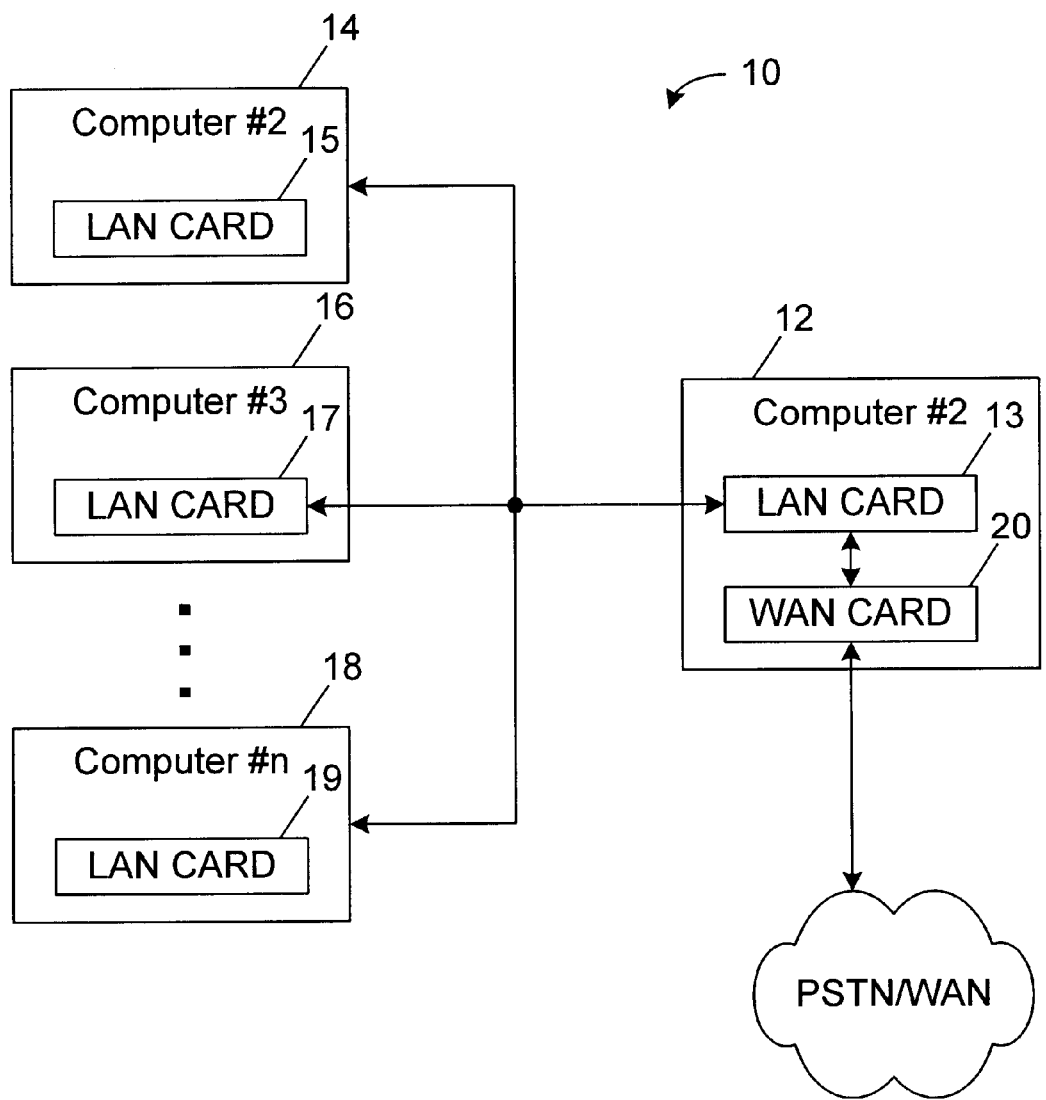
FIG. 1 is a block diagram illustrating a prior art LAN network, capable of communicating with a WAN, through a single computer.

Having summarized various aspects of the present invention, reference will now be made in detail to the description of the. invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 2:
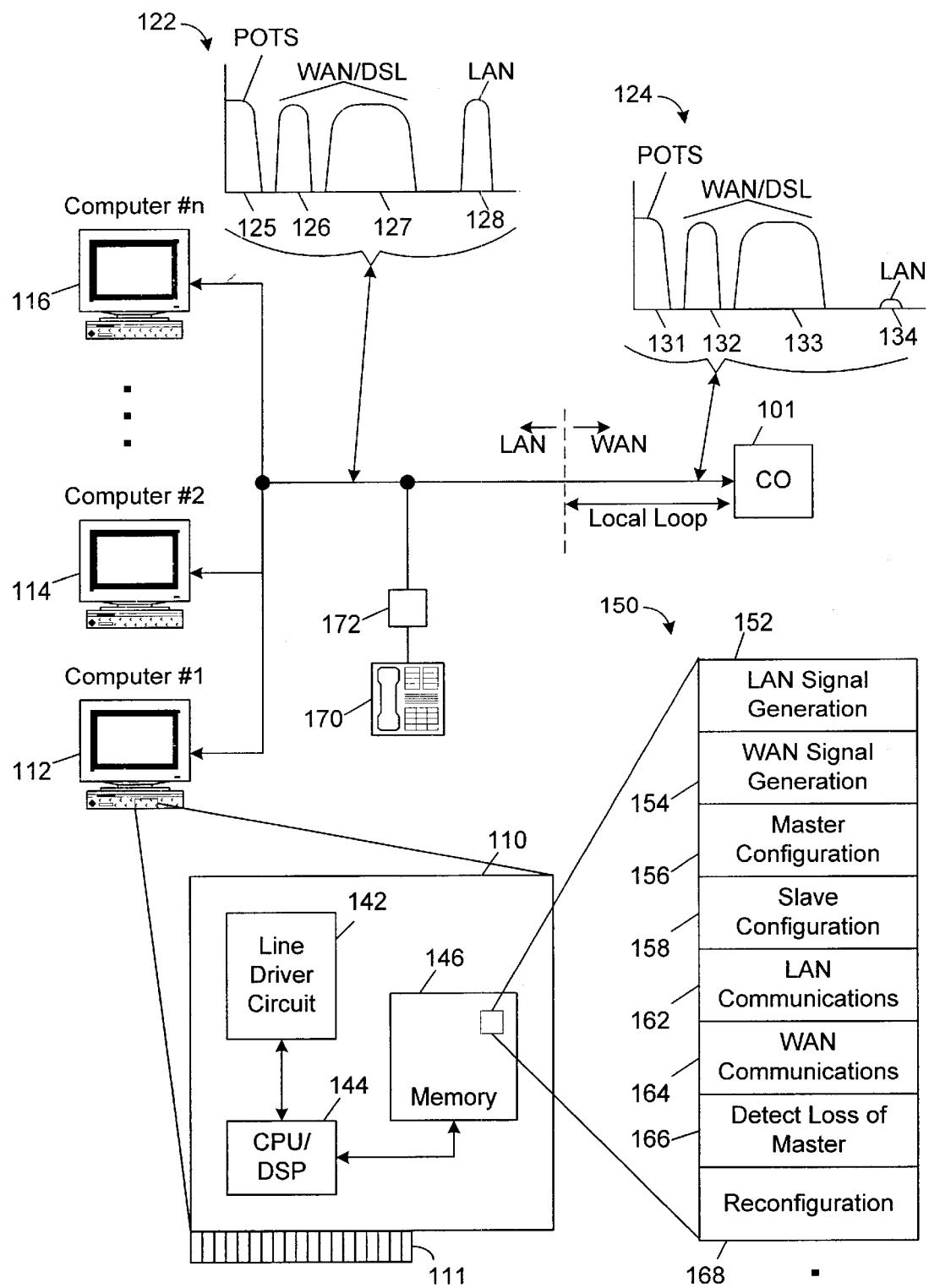
FIG. 2 is a block diagram illustrating a network computer system, including communications circuitry, in accordance with the present invention.

Turning now to the drawings, reference is made to FIG. 2 which illustrates a networked networking system 100 constructed in accordance with one embodiment of the present invention. The particular embodiment of the system illustrated in FIG. 2 represents a computer network in a home or small office environment, having passive termination. In a passively terminated system, the wiring from the local loop maintains electrical continuity to the standard telephone wiring that is disposed throughout the customer premises. As summarized above, the system and method of the present invention offers enhanced flexibility and significantly reduced complexity from the user standpoint. In this regard, a computer 112 embodying the present invention may be plugged into a standard phone jack for communication across both a local area network that is established within the customer premises, as well as a wide area network, which includes the local loop as well as other portions of the PSTN. From the user standpoint, a second computer 114 embodying the present invention may be plugged into a separate phone jack somewhere within the customer premises, and the two computers automatically recognize one another and establish LAN communications across the wiring within the customer premises. The first computer that is powered up also establishes WAN communications with the central office 101 over the local loop. In the preferred embodiment, the WAN communications will be in the form of DSL communications. However, other forms of communications or services may be utilized, consistent with the scope and spirit of the present invention.

Each subsequent computer that is plugged into a phone jack within the customer premises establishes communication with the remaining computers therein across the LAN. Any communications that must be made across the WAN, proceed through the first computer that is powered up. Therefore, subsequently connected and powered up computers communicate across the WAN by relaying their communications through the first computer that is powered up. As will be described in more detail below, during power-up, this first computer configures itself as a "master", while subsequently powered up computers configure themselves as "slave" computers. Nevertheless, from a user standpoint, each computer that is powered up recognizes the other computers that are powered up and exist on the local area network (i.e., within the customer premises), as well as recognizing that each has access to the wide area network (e.g., the Internet). The fact that communications may be relayed through a secondary computer is transparent to the user.

To more particularly describe this configuration and operation, the essence of the present invention is preferably embodied in a circuit 110 that is included within a computer 112. The circuit 110 may be provided in the form of a circuit card that may be plugged into a motherboard via edge connector 111, or alternatively, may be embedded within the circuitry that may be provided on the motherboard, for example, of a computer 112. Although not specifically illustrated, additional computers 114 and 116 will preferably include circuitry identical to the circuit 110.

The circuit 110 of the present invention includes the capability to communicate both over the WAN (e.g., DSL communication) as well as over the LAN. In accordance with the preferred embodiment, the communications that take place over the LAN are in a frequency band that is much higher than the highest frequency of the WAN communications. In terms of actual frequencies, the actual frequencies may vary. As is known, higher frequency signals become attenuated over a shorter span of cable than lower frequency signals. Many local loops cannot support DSL signals above 1.5 MHz in frequency. Therefore, the upper frequency boundary for the DSL or WAN signals may be approximately 1.5 MHz. In contrast, the frequency band for the local area network signaling may exist, for example, in a frequency range extending from approximately 4 MHz to 8 MHz. As will be appreciated, signals in this frequency range may be freely communicated within the wiring spans of a customer premises, without notable attenuation. However, once these signals are directed out onto the local loop they become rapidly attenuated, and are virtually negligible in amplitude by the time they reach the central office. Diagrams illustrating these signal spectra are designated by reference numerals 122 and 124. Specifically, diagram 122 represents the signal spectra within a customer premises while diagram 124 represents the signal spectra at or near the central office 101.

As is observed, each of the signal spectra include three frequency bands 125, 126, and 127 (at the customer premises) and 131, 132, and 133 (at or near the central office) that are virtually identical. In this regard, the frequency band denoted by reference numerals 125 and 131 extends from approximately DC to approximately 4 kHz and carries the voice band signals (also referred to as pots band).

The frequency band denoted by reference numerals 126 and 132 carry signals transmitted from the customer premises in the direction of the central office (often referred to as the upstream signal band of a DSL communications). The frequency band denoted by reference numerals 127 and 133 typically has a wider bandwidth than the frequency band 126, 132, and it carries DSL communications from the central office toward the customer premises (also referred to as downstream traffic). Finally, the frequency band denoted by reference numerals 128 and 134 is the frequency band that carries the local area network signaling, generated and utilized by the present invention. As represented in the diagrams 122 and 124, the amplitude of frequency band 134 near the central office 101 is much attenuated from the frequency band 128 within the customer premises.

In keeping with the description of the present invention, the circuitry 110 will typically comprise a line driver circuit 142, responsible for interfacing with the telephone line, which will include analog circuitry that is configured to both drive and receive the signals (both WAN and LAN) carried across the wiring of the customer premises. Additional circuitry may include a CPU or DSP 144 that is configured to perform the primary processing tasks of the circuit 110. Finally, the circuit 110 may include a memory 146, that may include both RAM and ROM, and is disposed in communication with the DSP or CPU 144. As should be appreciated, a variety of functions (discussed below) may be provided to enable the circuit 110 to perform various functions, in accordance with the present invention. This functionality may be designed directly into the hardware of the circuitry 110, or alternatively may be provided in the form of microcode, which may be stored within the memory 146. Alternatively, the circuitry 110 may be provided in a single ASIC (application specific integrated circuit), or some combination between an ASIC and analog circuitry comprising the line driver circuit 142.

To further illustrate certain features of the present invention by reference to various functional or logic segments that may be provided as a part of the circuitry 110, reference numeral 150 denotes a portion of memory 146 that may include microcode for carrying out various functions and features. Again, it should be appreciated that these functions or features need not be necessarily implemented in microcode, but may be implemented in other ways as well, such as dedicated circuitry. A first segment 152 is denoted as "LAN signal generation." This segment may be configured to generate the LAN signals for intercommunication with other computers 114 and 116 across the local area network. In one embodiment, the LAN spectrum may extend from approximately 4 MHz to approximately 8 MHz. Within this frequency band, however, the LAN signal may be communicated in accordance with a protocol that will be recognized by the other computers 114 and 116. The particular protocol that is selected for intercommunication may vary, consistent with the scope and spirit of the present invention. Indeed, in accordance with the broad concepts of the invention, a variety of protocols can be used, and therefore a specific protocol need not be described herein.

Similarly, a logic segment 154 may be provided for generating the WAN signal, which, as illustrated in diagrams 122 and 124, communicates at a much lower frequency range. Like the LAN signal, the protocol or line coding of the WAN signal may vary, consistent with the invention. For example, in DSL communications popular line codes include CAP (carrierless amplitude phase modulation), QAM (quadrature amplitude modulation), 2B1Q and DMT (discrete multi-tone). In addition, there are a variety of DSL protocols (as previously mentioned), such as ADSL, RADSL, HDSL, SDSL, etc. It should be understood that the circuitry conventionally implemented in, for example, a DSL transceiver will be included within the circuitry 110. The implementation of such circuitry will be appreciated by persons skilled in the art, and need not be described herein.

Two other logic segments are denoted as "master configuration" 156 and "slave configuration" 158. In accordance with a fundamental aspect of the present invention, when a first computer 112 is powered up, it configures itself as a "master" computer. In accordance with one embodiment of the present invention, when a computer 112 is first powered up it may broadcast a message within the LAN frequency band 128, which message is communicated to all other computers capable of listening to the LAN transmissions. Assuming no other computers are powered up, then no answer is made to this "broadcast" message. After a time-out period, the computer 112 which transmitted the broadcast message assumes that it is the first, and only, computer on the local area network, and it configures itself as a master. As a part of this configuration, the computer 112 establishes a communication link with the central office 101, via WAN communication. As is known, this initial startup period involves certain signal training, including the generation of coefficients for error correction coding filters, equalizers, etc. and this training will be understood by persons skilled in the art. Once the computer 112 is powered up, the circuit 110 may communicate on an as needed basis over both the LAN and the WAN. Of course, these communications will necessarily be controlled at a higher level within the OSI model (such as the application level).

Once powered up and configured, the circuit 110 will also monitor the phone line for incoming communications, both within the WAN spectra as well as the LAN spectra. By way of further illustration, when a second computer 114 connected to the LAN is powered up, that computer will transmit a "broadcast" signal within the LAN spectra 128 to determine whether any other computers exist. Upon sensing this broadcast message from another computer, computer 112 may transmit a reply (again within the LAN spectra 128). In this reply message, the computer 112 informs the computer 114 that it is the "master" of the local area network. Therefore, the computer 114 recognizes that it need not establish WAN communications with the central office 101 (e.g., no coefficient training, etc.). Instead, whenever a user of the computer 114 desires communication over the WAN (e.g., Internet communications), those communications may be routed via LAN spectra 128 from computer 114 to computer 112. The computer 112 may then relay these communications via WAN spectra 126 and 127 to the central office 101. When responsive communications are received from the central office 101, they are received by computer 112 and then relayed to computer 114 by way of the higher frequency LAN communication frequency band 128. The logic for handling these LAN and WAN communications are designated as segments 162 and 164, within the circuit 110.

It will be appreciated that there are a variety of ways that the signaling between the computers 112 and 114 and between the computer 112 and the central office 101 may be configured and coordinated. For example, in a typical Internet/browser communication scenario, a browser running on computer 114 typically specifies a URL (which maps to a logical IP address) of a web page, and then waits to receive the web page that is retrieved. Information regarding the process or session that is executing on computer 114 may be communicated to the computer 112 and utilized in connection with the communications between the computer 112 and the central office 101 so that reply messages received from the central office 101 by computer 112 may be properly identified as belonging to computer 114, so they may be redirected accordingly.

As other computers within the local area network are powered up, they may issue similar broadcast messages to determine whether other computers are presently up and running on the local area network. In continuing with the example, assume that computer 116 is powered up. It transmits over the LAN spectra a broadcast message, and receives replies from both computers 112 and 114. The reply from computer 112 indicates that it is presently configured as the master, so that all communications destined for the WAN must be communicated through computer 112. Computer 114 responds by informing computer 116 that it is also sharing the LAN, and is configured as a slave. In this way, the software executing on computer 116 may readily recognize the other computers that are on the network, for intranetwork communications.

Consistent with the invention, additional logic segments may be provided. For example, one segment 166 may be configured to detect the loss of a master. Suppose, for example, that the user of computer 112 shuts that computer down, or alternatively the computer crashes. The remaining computers 114 and 116 on the local area network should be able to detect the loss of this master and then reinitiate a proceeding to "elect" a new master. Likewise, another logic segment 168 should be provided to perform a "reconfiguration" in response to the election of a new master. There are a variety of ways that this election may take place, and one will be discussed in connection with the flow charts below.

As will be further understood by persons skilled in the art, a telephone 170 may be plugged directly into a phone jack, as is conventionally done. Preferably, a low-pass filter 172 may be connected between the telephone 170 and phone line to reduce noise (in the form of intermodulation products) that may sometimes be present on the telephone within the audible range, due to higher frequency signals being communicated across the LAN.

Figure 3:
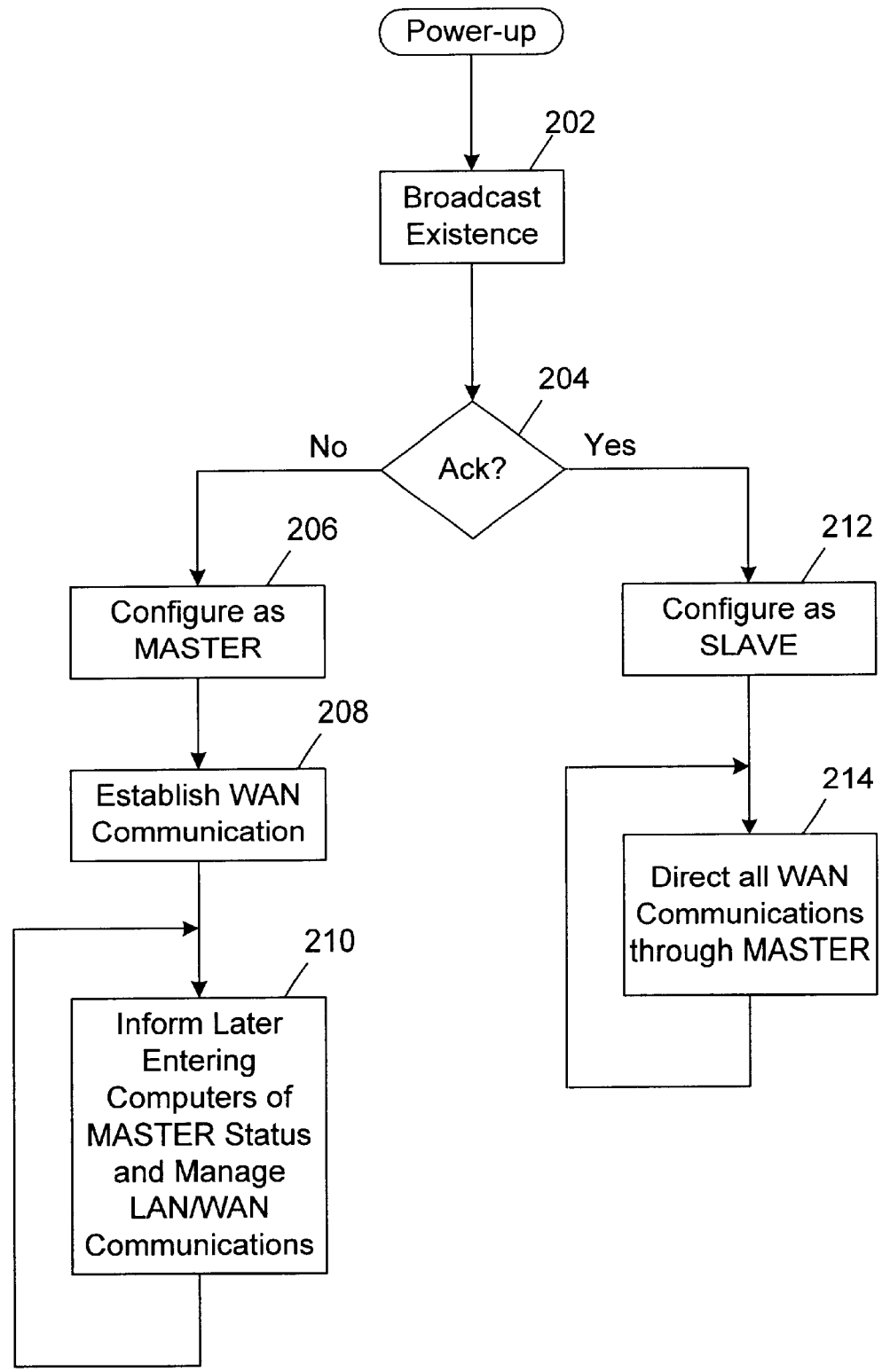
FIG. 3 is a flow chart illustrating the top-level functional operation of a computer constructed in accordance with the present invention.

Having provided a top level description of a system constructed in accordance with the present invention, reference is now made to FIG. 3, which is a flow chart illustrating the top level functional operation of a computer constructed in accordance with the invention. In accordance with one embodiment of the invention, after power-up a computer communicates a broadcast message over the local area network to effectively announce its presence or existence on the network (step 202). The computer may then wait for a reply (or replies), which may be received during a predetermined time out period (step 204). If no acknowledgement or reply is received, then the computer configures itself as a master (step 206) and proceeds to establish communications over the WAN (step 208). Thereafter, and for the time period that the master remains active, it monitors local area network traffic to identify other computers that establish connection and communication to the local area network, and informs them of its master status, and manages the various LAN/WAN communications (step 210).

If, however, the broadcast message of the computer is acknowledged (step 204) by one or more computers on the local area network, then the computer configures itself in a slave configuration (step 212). Thereafter, all WAN communications for that computer take place by first communicating through the master (step 214). The computer will effectively continue operating in that loop until it is powered down.

Figure 4A:
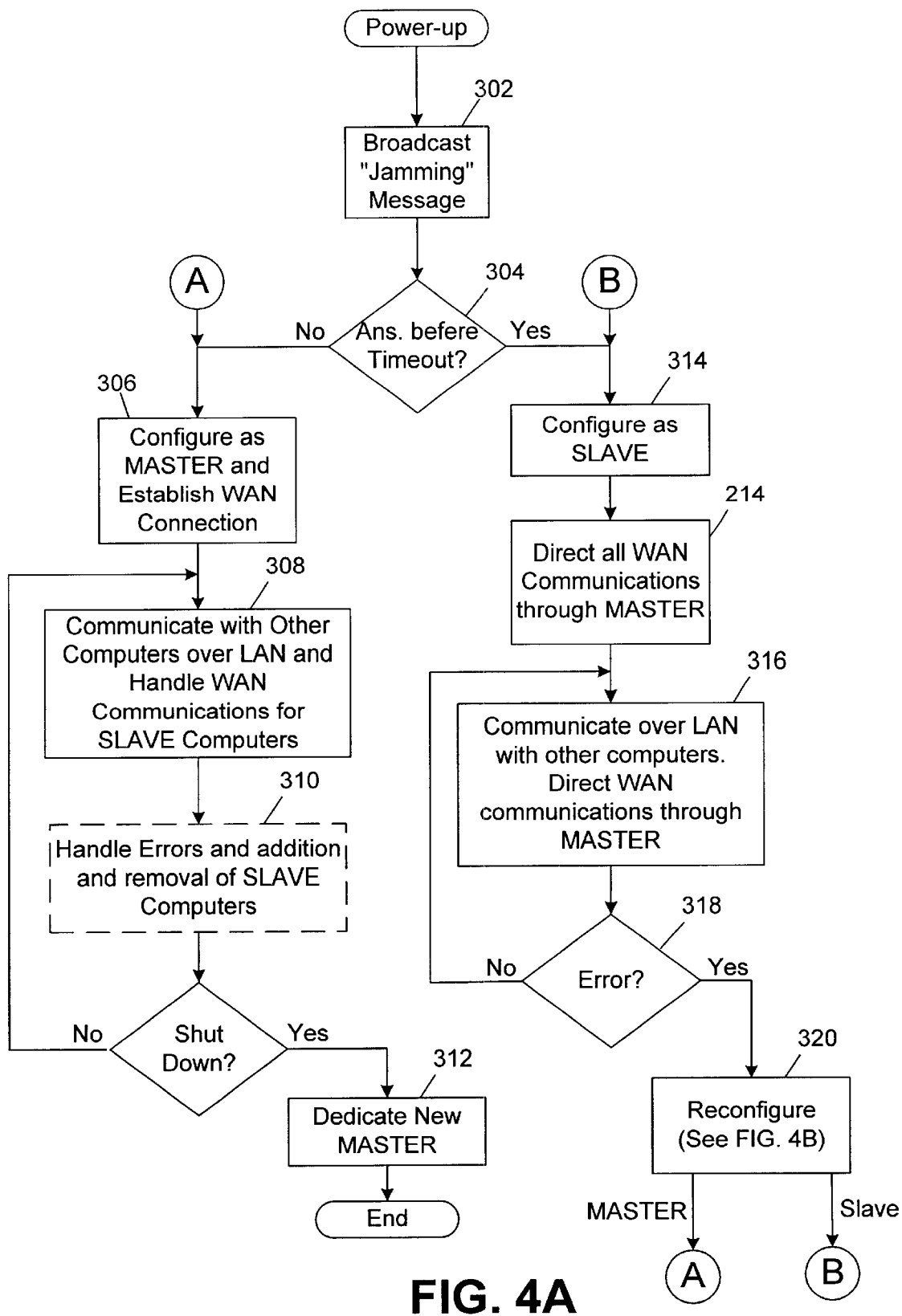
FIGS. 4A and 4B comprise a flow chart illustrating the operation of a computer constructed in accordance with one embodiment of the present invention.
Figure 4B:
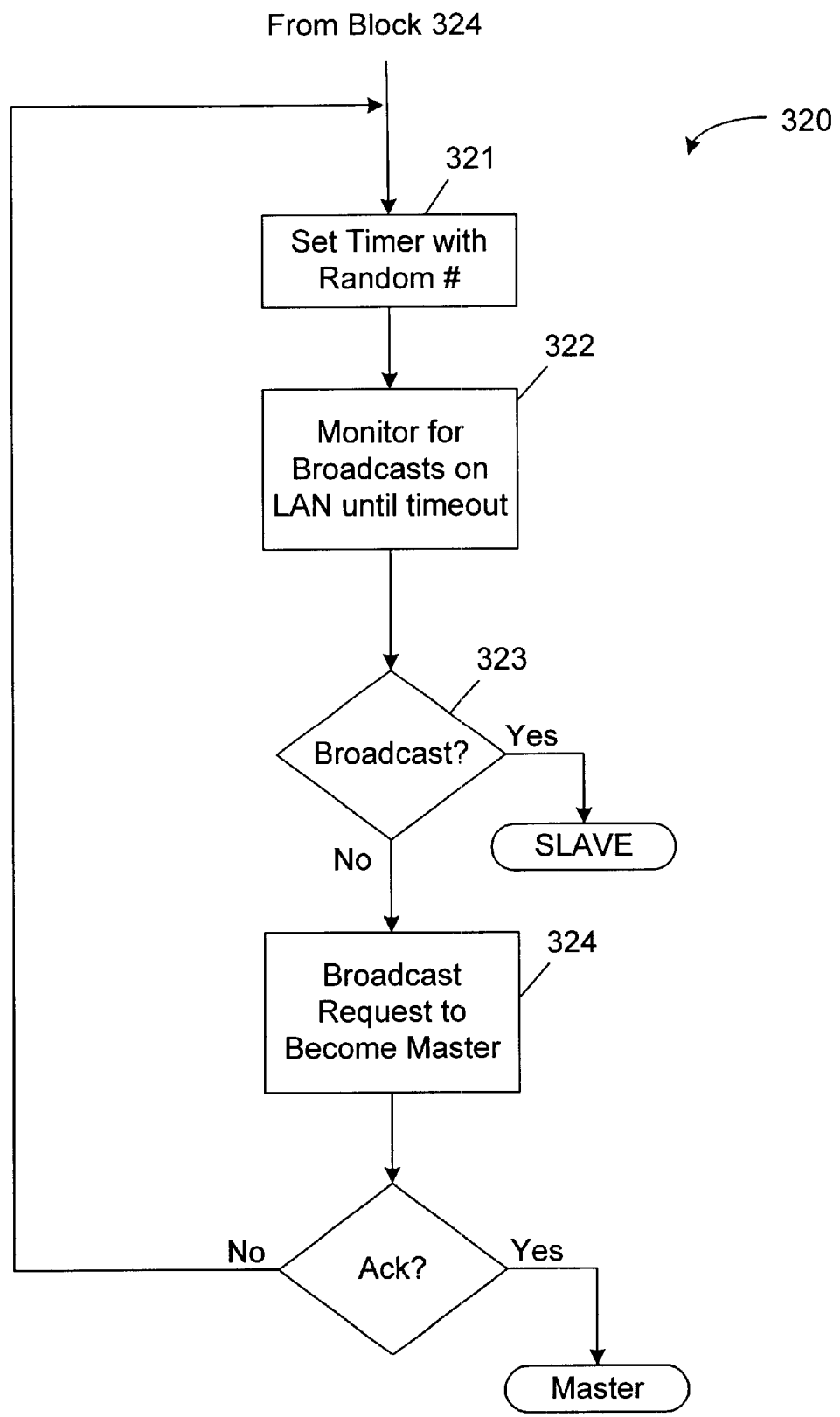

Reference is now made to FIGS. 4A and 4B, which illustrate the same general functionality illustrated in the flow chart of FIG. 3, but providing further detail with regard to one embodiment of the present invention. More particularly, upon power-up, a computer may broadcast a "jamming" message within the LAN frequency spectra to announce its presence on the LAN (step 302). At step 304, the computer may wait for a predetermined period of time to determine whether its broadcast message is answered by any other computers on the local area network. If not, it configures itself as a master and establishes a WAN connection with the central office (step 306). After configuration, the master computer monitors the LAN for broadcast messages of other computers that power-up and become connected to the LAN. After identifying such other computers, the master manages the communications with the other computers over the LAN, as well as handles WAN communications for the various slave computers (step 308). Another feature that may be desired, is the handling of various errors and/or the removal of slave computers (step 310).

In one scenario, as various computers are purposely shut down by a user, they may broadcast a message to the network telling all other computers that they are being shut down, and therefore leaving the network. This allows applications running on the various computers to recognize that the computers being shut down are no longer accessible over the LAN. Alternatively, if one of the other computers crashes, a segment may be provided for recognizing this condition. One way in which this feature may be implemented is simply by recognizing the absence of a computer. Once all computers are operational and communicating across the LAN, each may transmit a periodic signal simply for the purpose of informing all other computers that it is still present on the network. If this periodic signal is not received by the other computers, then the other computers may assume this condition to indicate that the computer is no longer present on the LAN. In a similar fashion, if the present computer is directed to be shut down (i.e., by a user directing an application program) then it may be configured to announce this to the other computers on the LAN and either dedicate a new master (step 312), or allow the remaining computers to designate a new master.

Returning to the evaluation of step 304, if the computer receives a reply to its broadcast message, then it configures itself as a slave device (step 314). Thereafter, it communicates over the LAN in the same fashion as the other computers on the LAN, using the high frequency LAN spectra (step 316). Also, it directs all WAN communications through the master. Various mechanisms may be provided for a computer configured as a slave to detect an error in communication or otherwise recognize the need to dedicate a new master. More specifically, a computer may receive a direct signal (like the one generated by step 312) from another master indicating that it is being shut down or is otherwise disconnecting from the local area network. Alternatively, a computer may broadcast a message for communication to the WAN and never receive a response. Further still, the computer configured as a slave may send a periodic signal to the master and wait for an acknowledgment as a means for determining the continued presence of the master. Notwithstanding the particular mechanism implemented, a mechanism may be implemented to detect an error in communication with the master (step 318). Upon detecting an error, the computer may be configured to perform a reconfiguration (step 320). If, during this reconfiguration, the computer determines itself to be reconfigured as a master, then it proceeds to step 306 and continues operating in the manner described above. Alternatively, if the computer again determines itself to be configured as a slave device, it proceeds to step 314 and continues as described above.

There are a variety of ways that this reconfiguration feature may be implemented. One way is simply to allow whatever computer may detect the loss of the master to broadcast a signal requesting recognition as the "new master". If it receives acknowledgment back from the various other computers on the local area network, then it may reconfigure itself as a master. Otherwise, if it receives an acknowledgment, particular to the affect that another computer has configured itself as a master, then it may configure itself as a slave.

FIG. 4B illustrates another way of implementing this reconfiguration feature, so as to minimize "collisions" as multiple computers transmit a broadcast message at the same time, may be to set an internal timer with a random number (step 322). While the timer is timing down, the computer could monitor LAN communications to determine whether another computer transmits a broadcast message requesting acknowledgment as a master (steps 322 and 323). If another computer has transmitted such a broadcast message, then the computer reconfigures itself as a slave. Alternatively, if no other message is received when the timer times down, then the present computer broadcasts a message to become the master (step 324). The computer may then wait to see if it receives acknowledgments, and if so, configures itself as a master. With regard to the step of receiving acknowledgments, it should be appreciated that if no communications are received at all, then the computer may assume that no other computers are on the network, and therefore configure itself as a master.

It will be appreciated that what has been described above is a relatively top level architecture and function of a system and method for accommodating a point to multipoint LAN (e.g., a DSL) network, while facilitating intracomputer LAN communications in, for example, a home or small office environment.

Figure 5:
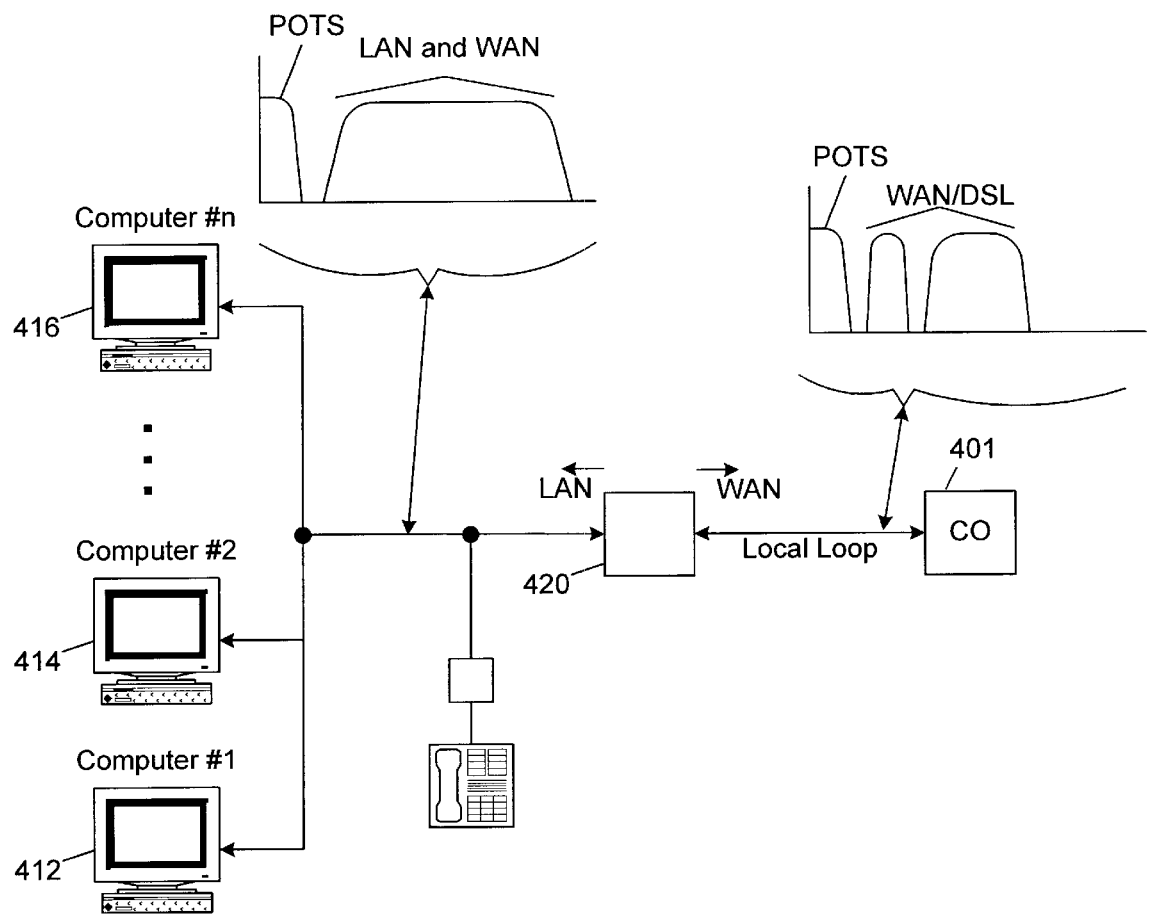
FIG. 5 is a block diagram, similar to FIG. 2, illustrating a slightly different networked computer system.

As will be appreciated by persons of ordinary skill in the art, and with reference briefly to FIG. 5, the broad concepts and teachings of the present invention described above may be applied to systems having active termination as well. As is known, the principle difference between a system having active termination, such as that illustrated in FIG. 5, and a passively terminated system, such as that illustrated in FIG. 2, is that an actively terminated system requires the insertion of an electrical unit 420 between the local loop and the customer premises (usually where the local loop terminates at the customer premises). The electrical signals communicated from the central office to the customer premises are regenerated within the electrical unit 420 and retransmitted within the area inside the customer premises. Likewise, electrical signals generated within the customer premises for communication to the central office 401 are terminated within the electrical unit 420, and regenerated therein for transmission across the local loop. It will be appreciated that an actively terminated system is a much more complex system, but allows more flexibility and freedom within the customer premises site with regard to the allocation of signal spectra. However, the inventive concept of establishing a dynamic network such that any computer can be a master of the network, and one which controls communications over the WAN may be equally applied to an actively terminated network.

In this regard, the embodiment or embodiments discussed herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for a computer to establish a digital subscriber line connection with a WAN, from within a LAN, comprising the steps of:

communicating a broadcast message over the LAN, wherein the step of communicating a broadcast message over the LAN includes communicating a message in a frequency band exceeding a highest frequency of the WAN;

awaiting a reply;

assuming a master configuration, if no reply is received within a timeout period; and assuming a slave configuration, if a reply is received, wherein the reply identifies a computer that is configured as a master.

2. The method of claim 1, wherein the step of assuming a slave configuration includes communicating all signals and messages to the WAN through another computer that is identified as the master.

3. The method of claim 1, wherein the step of assuming a master configuration includes communicating a broadcast message over the LAN includes communicating a message in a frequency band exceeding a highest frequency of the WAN.

4. The method of claim 1, wherein the step of assuming a slave configuration further includes the step of determining if the computer identified as the master discontinues operation.

5. The method of claim 4, further including the step of monitoring the LAN for another computer to communicate a broadcast message to configure itself as a master, and acknowledging that broadcast message, if the broadcast message is received with a predetermined timeout period.

6. The method of claim 5, further including the steps of:

communicating a second broadcast message over the LAN, in response to the identification of the discontinued operation of the master, if no other broadcast message is received from another computer within the predetermined timeout period;

assuming a master configuration, if no reply is received within a timeout period; and assuming a slave configuration, if a reply is received, wherein the reply identifies a computer that is configured as a master.

7. A communication circuit for equipping a computer to communicate over both a LAN and a WAN comprising:

WAN communication circuitry for generating signals for communication over the WAN in accordance with a predetermined transmission frequency and protocol;

LAN communication circuitry for generating signals for intra-LAN communication, the LAN communication circuitry configured to generate a signal that is transmitted in a frequency band that exceeds the highest transmission frequency of signals communicated over the WAN;

first logic, operable upon a reset condition, configured to determine whether any other computer is presently in communication with the LAN;

second logic configured to establish WAN communications from the computer within a WAN frequency band, if the first logic indicates that no other computer is presently in communication with the LAN; and third logic configured to direct WAN communications through another computer on the LAN, communicating these communications through the another computer, within a LAN frequency band.

8. The communication circuit of claim 7, wherein the LAN frequency band is higher than the WAN frequency band.

9. The communication circuit of claim 7, wherein the first logic, second logic, and third logic comprise segments of micro-code.

10. The communication circuit of claim 7, wherein the first logic, second logic, and third logic comprise dedicated circuitry.

11. The communication circuit of claim 7, wherein the first logic is further configured to determine whether another computer is presently in communication with the LAN that has already established a communication link over the WAN.

12. The communication circuit of claim 7, wherein the WAN communications use a digital subscriber line (DSL) service.

13. The communication circuit of claim 8, further including fourth logic configured to detect an error condition in communicating WAN communications through an another computer.

14. The communication circuit of claim 7, further including sixth logic configured to receive communications from another computer within the LAN frequency band destined for the WAN, and directing these communications over the WAN, using the WAN frequency band.

15. The communication circuit of claim 13, further including fifth logic, responsive to the fourth logic, the fifth logic configured to perform a task selected from the group consisting of:

directing WAN communications directly over the WAN, within the WAN frequency band; and directing WAN communications through another computer, within the LAN frequency band.

16. A computer configured to communicate over both a LAN and a WAN comprising:

WAN communication circuitry for generating signals for communication over the WAN in accordance with a predetermined transmission frequency and protocol;

LAN communication circuitry for generating signals for intra-LAN communication, the LAN communication circuitry configured to generate a signal that is transmitted in a frequency band that exceeds the highest transmission frequency of signals communicated over the WAN;

first logic, operable upon a reset condition, configured to determine whether any other computer is presently in communication with the LAN;

second logic configured to establish WAN communications from the computer within a WAN frequency band, if the first logic indicates that no other computer is presently in communication with the LAN; and third logic configured to direct WAN communications through another computer on the LAN, communicating these communications through the another computer, within a LAN frequency band.

17. A computer configured to communicate over both a LAN and a WAN comprising:

WAN communication circuitry for generating signals for communication over the WAN in accordance with a predetermined transmission frequency and protocol;

LAN communication circuitry for generating signals for intra-LAN communication, the LAN communication circuitry configured to generate a signal that is transmitted in a frequency band that exceeds the highest transmission frequency of signals communicated over the WAN;

detection circuitry for detecting whether another at least one other computer is communicating with the LAN;

master circuitry, responsive to the detection circuitry, for configuring the computer as a Master computer on the LAN, if no other computers are initially in communication with the LAN; and slave circuitry, responsive to the detection circuitry, for configuring the computer as a Slave computer on the LAN, if at least one other computer is detected as being in communication with the LAN.

18. The computer of claim 17, further including logic to direct WAN communications over the WAN, using the WAN communication circuitry, if the computer is configured as a Master.

19. The computer of claim 17, further including logic to direct WAN communications over the LAN, using the LAN communication circuitry, if the computer is configured as a Slave, whereby the WAN communications are communicated over the WAN by another computer that has been configured as a MASTER.

20. A communication circuit for configuring a computer to communicate over both a LAN and a WAN comprising:

WAN communication circuitry for generating signals for communication over the WAN in accordance with a predetermined transmission frequency and protocol;

LAN communication circuitry for generating signals for intra-LAN communication, the LAN communication circuitry configured to generate a signal that is transmitted in a frequency band that exceeds the highest transmission frequency of signals communicated over the WAN;

detection circuitry for detecting whether another at least one other computer is communicating with the LAN;

master circuitry, responsive to the detection circuitry, for configuring the computer as a Master computer on the LAN, if no other computers are initially in communication with the LAN; and slave circuitry, responsive to the detection circuitry, for configuring the computer as a Slave computer on the LAN, if at least one other computer is detected as being in communication with the LAN.

* * * * *